(12) United States Patent
Schauer et al.

(10) Patent No.: US 6,970,516 B1
(45) Date of Patent: Nov. 29, 2005

(54) PROGRAMMABLE POLARITY FOR HIGH SPEED DIFFERENTIAL INTERFACES

(75) Inventors: Steven A. Schauer, Loveland, CO (US); Christopher D. Paulson, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 786 days.

(21) Appl. No.: 09/941,540

(22) Filed: Aug. 29, 2001

(51) Int. Cl.[7] .......................... H04B 3/00; H04L 25/00
(52) U.S. Cl. ...................... 375/257; 375/219; 375/220; 370/284; 370/201
(58) Field of Search ................. 375/257, 219, 375/220, 285; 326/82, 38; 370/284, 201, 370/536

(56) References Cited

U.S. PATENT DOCUMENTS

| | | | |
|---|---|---|---|
| 5,666,354 A * | 9/1997 | Cecchi et al. | 370/284 |
| 6,353,334 B1 * | 3/2002 | Schultz et al. | 326/82 |
| 6,515,508 B1 * | 2/2003 | Chang et al. | 326/38 |
| 6,618,383 B1 * | 9/2003 | Tomlins | 370/395.5 |

* cited by examiner

*Primary Examiner*—Phuong Phu
(74) *Attorney, Agent, or Firm*—Christopher P. Maiorana, P.C.

(57) ABSTRACT

A system generally having a first circuit, a second circuit, and a pair of non-crossing conductive paths. The first circuit may be configured to convert between (i) a serial signal on a first differential interface and (ii) a parallel signal. The pair of non-crossing conductive paths may connect the first differential interface with a second differential interface. The second circuit may be configured to invert the parallel signal in response to a control signal in an inverting state.

18 Claims, 5 Drawing Sheets

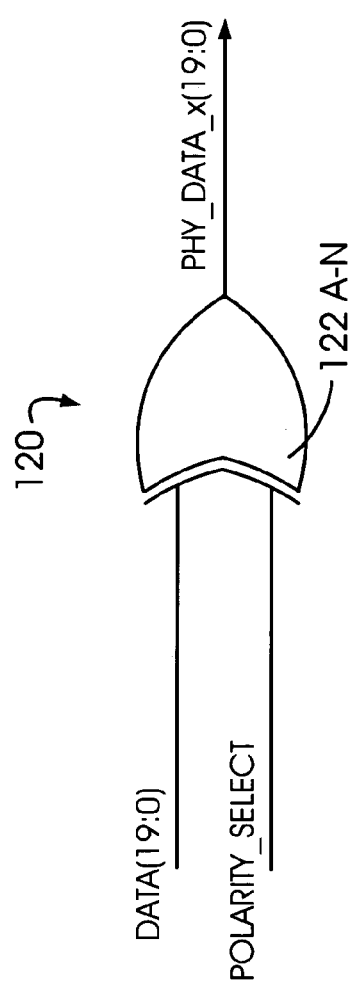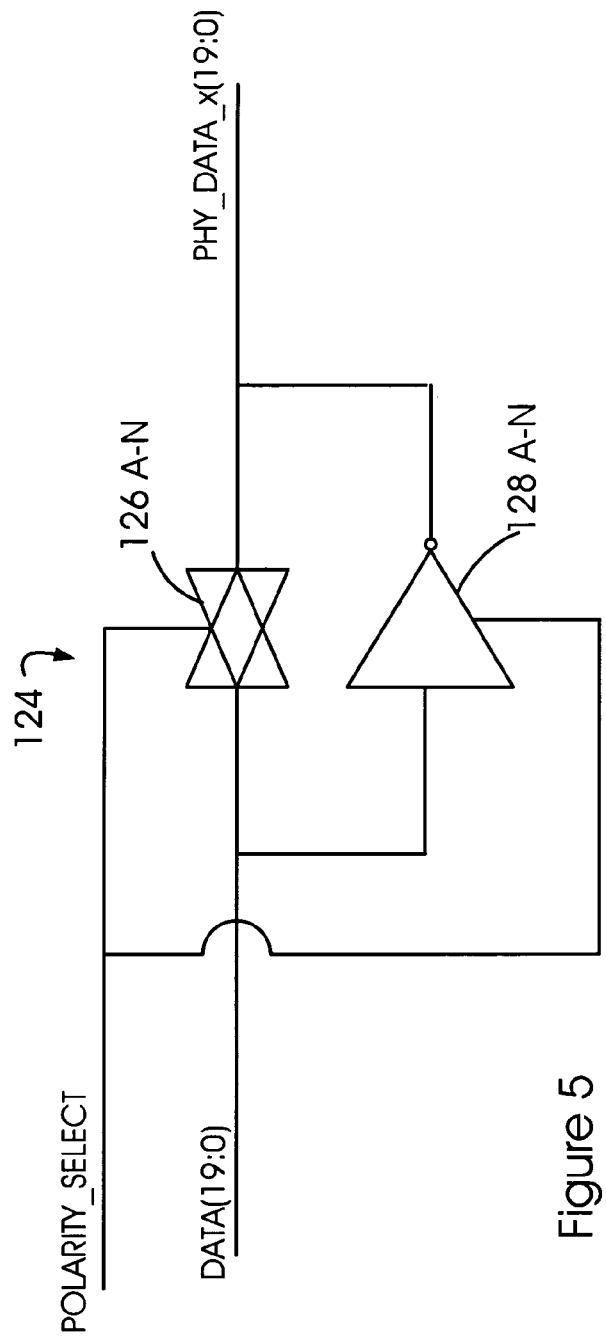

PROGRAMMABLE POLARITY FOR HIGH SPEED DIFFERENTIAL INTERFACES

FIELD OF THE INVENTION

The present invention relates to a method and/or architecture for differential interfaces generally and, more particularly, to programming a polarity for a high speed signal on a differential interface.

BACKGROUND OF THE INVENTION

A high speed differential transceiver is commonly used in Fibre channel, Gigabit Ethernet, Serial ATA interfaces and other high speed serial bus standards. A physical layout/pinout of the transceiver is set by the appropriate standard and cannot be changed. The standards identify specific pins for the high-speed differential signals (i.e., RX+, RX−, TX+, and TX−) and physical alignment to standard connectors. The standards conventionally prevent the high-speed differential signals from being physically routed over each other.

Referring to FIG. 1, pinouts of a connector 10 that are required by the given standard interface do not line up with the current pinouts of a particular high-speed transceiver 12. In order to connect the differential receive lines and differential transmit lines to the required connector 10, the high speed differential signals RX+, RX−, TX+ and TX− need to be crossed over each other, either in the high-speed transceiver 12 or on the printed circuit board 14 (shown at points 16 and 18). Since the signals RX+, RX−, TX+ and TX− are very high speed (i.e., 1.5 Gigabits/sec to 3 Gigabits/sec) the amount of noise coupling that can occur from the "crossing over" of the signals can cause large increases in noise, jitter and bit error rates.

Printed circuit board designers are aware of the problems that the cross-overs cause. Crossing the high speed signals RX+ with RX− (and TX+with TX−) causes a certain amount of noise to be cross-coupled between the signals thus compromising signal integrity. Therefore, a large amount of time, effort and money is spent to minimize the induced effects of the cross-overs. Despite the efforts, the presence of the cross-overs will still cause some noise to be coupled over. Consequently, a risk is incurred in meeting the jitter requirements and bit error rates (BER) while allowing the transceiver to function robustly. Redesigning the transceiver to un-cross the signals is commonly unacceptable due to the amount of time and capital resources required. The cost of a new design include complete characterization testing and creating completely separate product tracking and support requirements.

SUMMARY OF THE INVENTION

The present invention concerns a system generally having a first circuit, a second circuit, and a pair of non-crossing conductive paths. The first circuit may be configured to convert between (i) a serial signal on a first differential interface and (ii) a parallel signal. The pair of non-crossing conductive paths may connect the first differential interface with a second differential interface. The second circuit may be configured to invert the parallel signal in response to a control signal in an inverting state.

The objects, features and advantages of the present invention include providing a circuit for programming a polarity for a high speed signal on a differential interface that may (i) simplify routing of the high-speed signals between the transceiver and a targeted connector, (ii) require a small area to implement, (iii) make the transceiver compatible with different interface standards, (iv) minimize cross coupling of the high-speed signals, (v) minimize jitter induced on the high-speed signals, and/or (vi) minimize an error rate for the high-speed signals.

BRIEF DESCRIPTION OF THE DRAWINGS

These and other objects, features and advantages of the present invention will be apparent from the following detailed description and the appended claims and drawings in which:

FIG. 4 is a schematic of a second embodiment of the programmable differential port module;

FIG. 5 is a schematic of a third embodiment of the programmable differential port module.

DETAILED DESCRIPTION OF THE PREFERRED EMBODIMENTS

Figure 2:
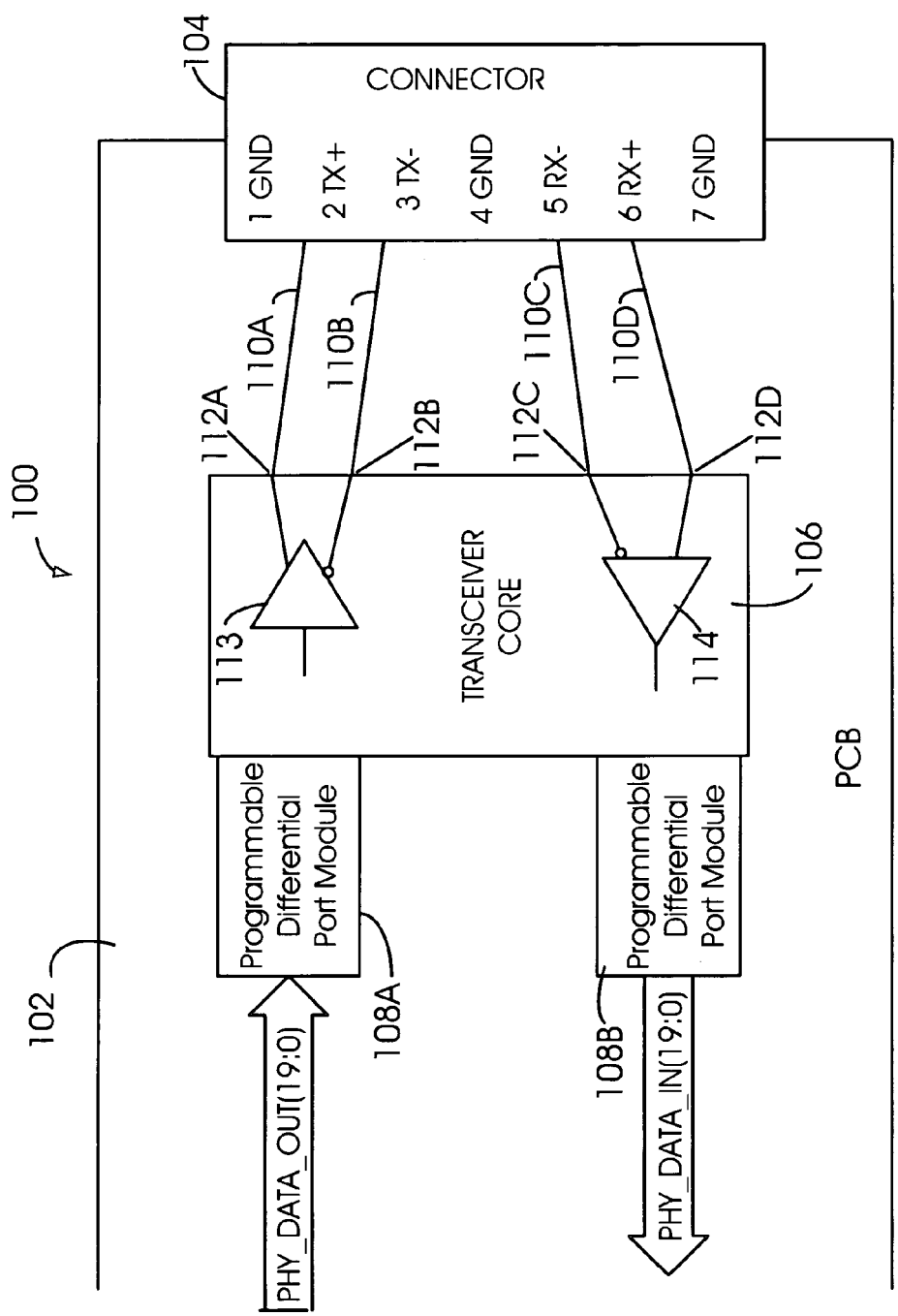
FIG. 2 is a block diagram of a system implementing the present invention.

Referring to FIG. 2, a block diagram of a system 100 is shown in accordance with a preferred embodiment of the present invention. The system 100 generally comprises a printed circuit board 102, a connector 104, a circuit 106, and one or more circuit 108A–B. The printed circuit board 102 may have multiple conductive paths 110A–D that connect the circuit 106 to the connector 104.

The circuit 108A may receive a signal (e.g., PHY_DATA_OUT). The circuit 108A may pass the signal PHY_DATA_OUT to the circuit 106 with or without inverting on a bit-by-bit basis. The circuit 106 may present the signal PHY_DATA_OUT as another signal (e.g., TX) to the connector 104.

The connector 104 may receive a signal (e.g., RX). The connector 104 may present the signal RX to the circuit 106. The circuit 106 may present the signal RX to the circuit 108B as another signal (e.g., PHY_DATA_IN). The circuit 108B may present the signal PHY_DATA_IN with or without inverting on a bit-by-bit basis.

The signals PHY_DATA_OUT and PHY_DATA_IN may be implemented as parallel signals having one or more packets of information. The signals PHY_DATA_OUT and PHY_DATA_IN are generally multi-bit digital type signals. In one embodiment, the signal PHY_DATA_OUT may contain two bytes of information arranged as twenty bits by an 8B10B conversion. The signal PHY_DATA_IN may contain twenty bits of information that may contain two bytes of information obtainable through a 10B8B conversion. Other arrangements of the signals PHY_DATA_OUT and PHY_DATA_IN may be implemented to meet the design criteria of a particular application.

The signals RX and TX may be implemented as differential signals (e.g., RX+, RX−, TX+ and TX−). The signals TX and RX may be analog type signals and/or digital type signals. In one embodiment, the signals TX and RX may be arranged as packets of at least ten bits to match the 8B10B and 10B8B conversions. In other embodiments, each packet may include additional bits such as error detection/correction bits and control bits such as start bits and stop bits.

Other arrangements for the signals RX+, RX−, TX+ and TX− may be implemented to meet the design criteria of a particular application.

The circuit 106 may be implemented as a transceiver core circuit. The transceiver core circuit 106 may operate to convert the parallel signal PHY_DATA_OUT to the serial signal TX. The transceiver core circuit 106 may convert the serial signal RX to the parallel signal PHY_DATA_IN. Conversion of the signal PHY_DATA_OUT to the signal TX may involve buffering or storing the signal PHY_DATA_OUT at a point in time and then converting each bit of the signal PHY_DATA_OUT into the signal TX in a time sequence. Conversion of the signal RX to the signal PHY_DATA_IN may involve buffering or storing each bit of the signal RX in a time sequence and then presenting all of the signal PHY_DATA_OUT at a later time. In one embodiment, the transceiver core circuit 106 may only send signal TX or only receive the signal RX. Other designs of the transceiver core circuit 106 may be implemented to meet the design criteria of a particular application.

A pair of the conductive paths 110A–B may carry the signals TX+ and TX− from a differential interface (e.g., outputs 112A–B) of the transceiver core circuit 106 to a differential interface (e.g., pin 2 and pin 3) of the connector 104 respectively. Another pair of the conductive paths 110C–D may carry the signals RX− and RX+ from another differential interface (e.g., pin 5 and pin 6) of the connector 104 to another differential interface (e.g., inputs 112C–D) of the transceiver core circuit 106 respectively. The conductive paths 110A–D may be implemented as traces of the printed circuit board 102, point-to-point wires, or the like.

The circuits 108A and 108B may be implemented as programmable differential port modules. The programmable differential port module 108A may be programmed to invert or not invert each bit of the signal PHY_DATA_OUT on a bit-by-bit basis. An effect of inverting each bit of the signal PHY_DATA_OUT may be to exchange the roles of the signals TX+ and TX− or functionally swap the polarity of a differential operational amplifier 113 within the transceiver core circuit 106. With each bit of the signal PHY_DATA_OUT inverted, the signal TX+ may have a time-dependent amplitude (or waveform) that appears to be the signal TX−. The signal TX− may have a time-dependent amplitude (or waveform) that appears to be the signal TX+.

The programmable differential port module 108B may be programmed to invert or not invert each bit of the signal PHY_DATA_IN on a bit-by-bit basis. An effect of inverting each bit of the signal PHY_DATA_IN may be to exchange the roles of the signals RX+ and RX− or functionally swap a polarity of a differential operational amplifier 114 within the transceiver core circuit 106. With each bit of the signal PHY_DATA_IN inverted, the signal RX+ may be received with a time-dependent amplitude (or waveform) that appears to be the signal RX−. The signal RX− may be received with a time-dependent amplitude (or waveform) that appears to be the signal RX+.

Figure 1:
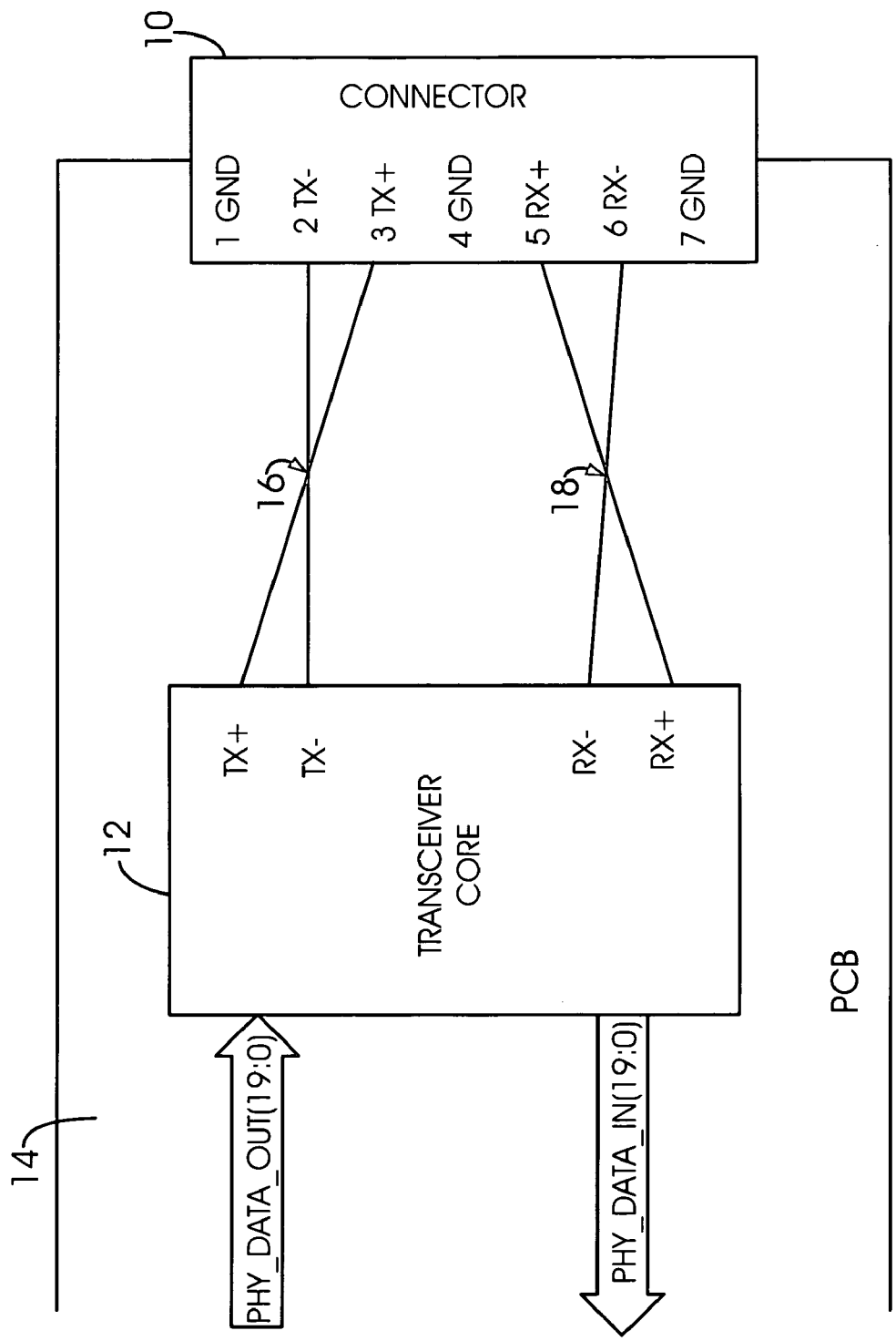
FIG. 1 is a block diagram of a conventional high-speed transceiver.

When the programmable differential port module 108A is programmed to pass-through or buffer the signal PHY_DATA_OUT without inverting, then the conductive paths 110A–B may follow non-crossing routes between the interfaces 112A–B and the pins 2 and 3 as shown in FIG. 2. In an embodiment where another connector (for example, connector 10 of FIG. 1) has the signal TX+ on the pin 3 and the signal TX− on the pin 2, then the programmable differential port module 108A may be programmed to invert each bit of the signal PHY_DATA_OUT. Inverting each bit of the signal PHY_DATA_OUT may cause the transceiver core circuit 106 to present at the interface 112A (and thus to pin 2 of the connector 10) in effect the signal TX− and at the interface 112B (and thus to pin 3 of the connector 10) in effect the signal TX+. As a result, the conductive paths 110A–B may follow non-crossing routes between the interfaces 112A–B and the pins 2 and 3 of the connector 10. By selectively programming the programmable differential port module 108A, the differential interface 112A–B of the transceiver core circuit 106 may be connected to either the connector 104 or the connector 10 with non-crossing conductive paths 110A–B.

When the programmable differential port module 108B is programmed to pass-through or buffer the signal PHY_DATA_IN without inverting, then the conductive paths 110C–D may follow non-crossing routes between the interfaces 112C–D and the pins 5 and 6 as shown in FIG. 2. In the embodiment where the transceiver core circuit 106 is connected to the connector 10, then the programmable differential port module 108B may be programmed to invert each bit of the signal PHY_DATA_IN. Inverting each bit of the signal PHY_DATA_IN may cause the transceiver core circuit 106 to treat the signal receive at the interface 112C (from pin 5 of the connector 10) as the signal RX+ and at signal received at the interface 112D (from pin 6 of the connector 10) as the signal RX−. As a result, the conductive paths 110C–D may follow non-crossing routes between the pins 5 and 6 of the connector 10 and the interfaces 112C–D. By selectively programming the programmable differential port module 108B, the differential interface 112C–D of the transceiver core circuit 106 may be connected to either the connector 104 or the connector 10 with non-crossing conductive paths 110C–D.

Advantages of providing for non-crossing paths for the conductive paths 110A–D may be to maintain (i) a low cross-talk, (ii) a low jitter, and (iii) a low bit-error rate for the high speed signals TX and RX. The ability to functionally swap the signals TX+ with TX− and RX+ with RX− may allow customers to simply and easily implement designs that are independent from the connector and/or existing transceiver core circuit designs. Examples of standard connector interfaces that may be linked to the transceiver core circuit 106 may include, but are not limited to the Fibre Channel, Gigabit, Ethernet, and Serial AT Attachment standards. The programming may eliminate the need for cross-overs within the transceiver core circuit 106 and/or on the printed circuit board 102.

One of ordinary skill in the art would appreciate an embodiment where the programmable differential port modules 108A–B may be used to uncross the conductive paths 110A–D due to different assignments of the signals TX+, TX−, RX+ and RX− to the interfaces 112A–D. For example, another transceiver core circuit (not shown) may normally present the signal TX+ at the output 112B and the signal TX− at the output 112A. By programming the programmable differential port module 108A to invert each bit of the signal PHY_DATA_OUT, the other transceiver core circuit may present at the output 112A what appears to be the signal TX+ and at the output 112B what appears to be the signal TX−. The other transceiver core circuit may also receive at the input 112C the signal RX+ and at the input 112D the signal RX−. By programming the programmable differential port module 108B to invert each bit of the signal PHY_DATA_IN, the input 112C may receive what appears to be the signal RX− and the input 112D may receive what appears to be the signal RX+. Therefore, the conductive paths 110A–D may follow non-crossing routes between the other transceiver core circuit and the connector 104.

Figure 3:
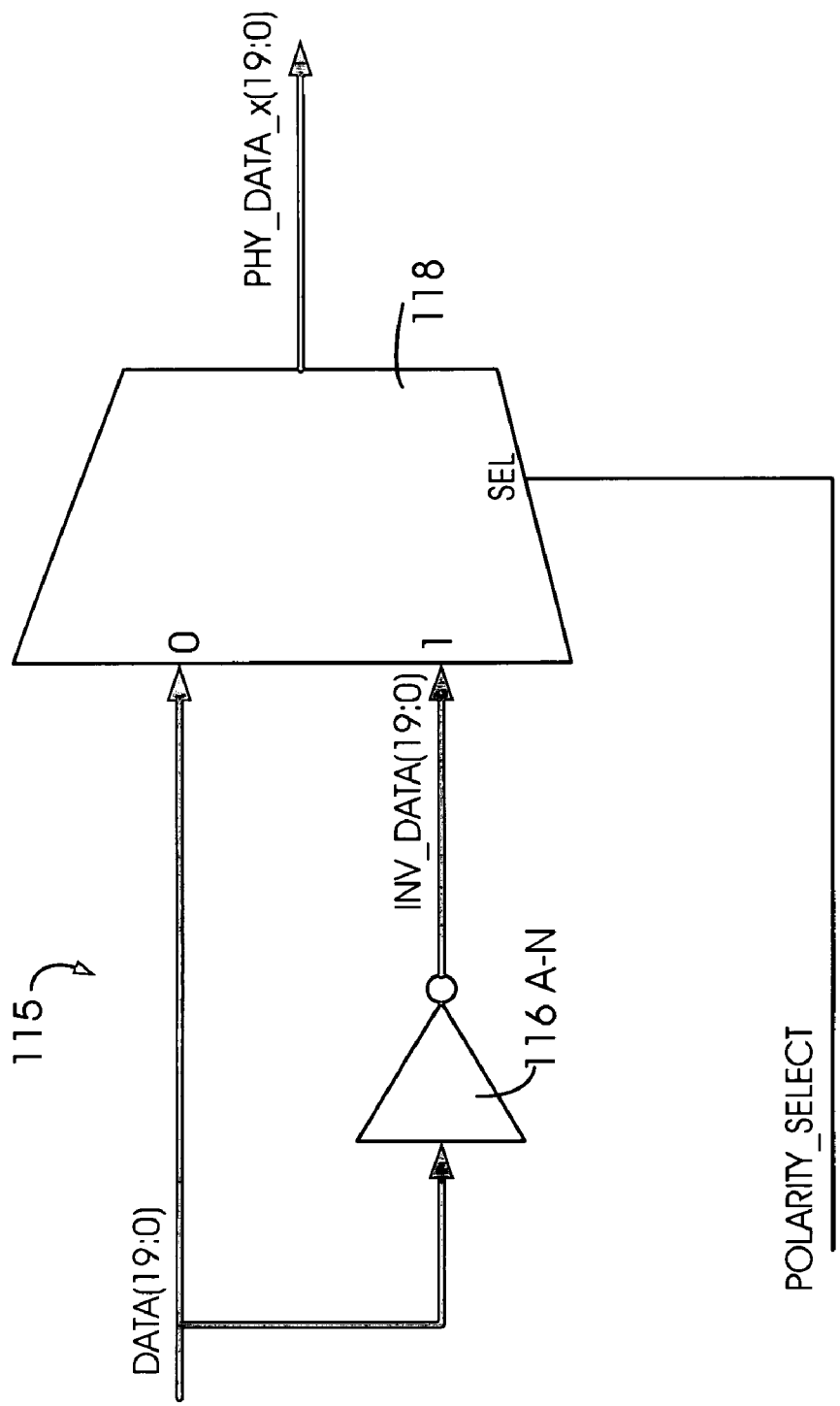
FIG. 3 is a schematic of a first embodiment of a programmable differential port module.

Referring to FIG. 3, an example circuit 115 implementing the programmable differential power module 108A and/or 108B is shown. The circuit 115 generally comprises several circuits 116A–N and a circuit 118. Each of the circuits 116A–N may be implemented as an inverter. The circuit 118 may be implemented as an N-bit wide multiplexer. Each of the inverters 116A–N may receive a bit of a signal (e.g., DATA, where DATA is may be the signal PHY_DATA_IN or the signal PHY_DATA_OUT) and present a bit of a signal (e.g., INV_DATA).

The multiplexer 118 may receive the signal DATA and the signal INV_DATA. The multiplexer 118 may also receive a control signal (e.g., POLARITY_SELECT). The multiplexer 118 may present the signal PHY_DATA_x (where x is "IN" or "OUT"). The signal POLARITY_SELECT may be used by the multiplexer 118 as a control signal to present the signal DATA or the signal INV_DATA as the signal PHY_DATA_x. For example, the multiplexer 118 may select the signal DATA while the signal POLARITY_SELECT is in a non-inverting state and the signal INV_DATA while the signal POLARITY_SELECT is in an inverting state.

For the programmable differential port module 108A, the signal DATA may be the signal PHY_DATA_OUT. For the programmable differential port module 108B, the signal DATA may be the signal PHY_DATA_OUT as received from the transceiver core circuit 106. The signal POLARITY_SELECT may be applied to both of the programmable differential port modules 108A–B. In one embodiment, the signal POLARITY_SELECT may be two independent signals, one applied to the programmable differential port module 108A and another applied to the programmable differential port module 108B.

Referring to FIG. 4, another example 120 implementing the programmable differential power module 108A and/or 108B is shown. The circuit 120 generally comprises a plurality of logic gates 122A–N. Each logic gate 122A–N may be implemented as an exclusive OR function. Each logic gate 122A–N may receive a bit of the signal DATA and the signal POLARITY_SELECT. Each logic gate 122A–N may present a bit of the signal PHY_DATA_x (where x is "IN" or "OUT"). While the signal POLARITY_SELECT is in a non-inverting (a logical LOW or a logical zero) state, the signal DATA may be buffered through logical gates 122A–N non-inverted and presented as the signal PHY_DATA_x. While the signal POLARITY_SELECT is in an inverting (a logical HIGH or a logical one) state, the signal DATA may be inverted by the logical gates 122A–N and presented as the signal PHY_DATA_x.

Referring to FIG. 5, an example circuit 124 implementing the programmable differential power module 108A or 108B is shown. The circuit 124 generally comprises a plurality of circuits 126A–N and a plurality of circuits 128A–N. Each of the circuits 126A–N may be implemented as a pass gate. Each of the circuits 128A–N may be implemented as a tri-state inverter. Each of the pass gates 126A–N may receive a bit of the signal DATA and present a bit of the signal PHY_DATA_x (where x may be "IN" or "OUT"). Each of the tri-state inverters 128A–N may also receive a bit of the signal DATA and present a bit of the signal PHY_DATA_x. The signal POLARITY_SELECT may be received by the pass gates 126A–N and the tri-state inverters 128A–N. The signal POLARITY_SELECT may have a non-inverting state where the pass gates 126A–N pass through the signal DATA to the signal PHY_DATA_x and the tri-state inverters 128A–N present a high-impedance. The signal POLARITY_SELECT may have an inverting state where the pass gates 126A–N present a high-impedance or open between the signal DATA and the signal and each tri-state inverter 128A–N drives a bit of the signal PHY_DATA_x with an inverse of a bit from the signal DATA.

Figure 6:
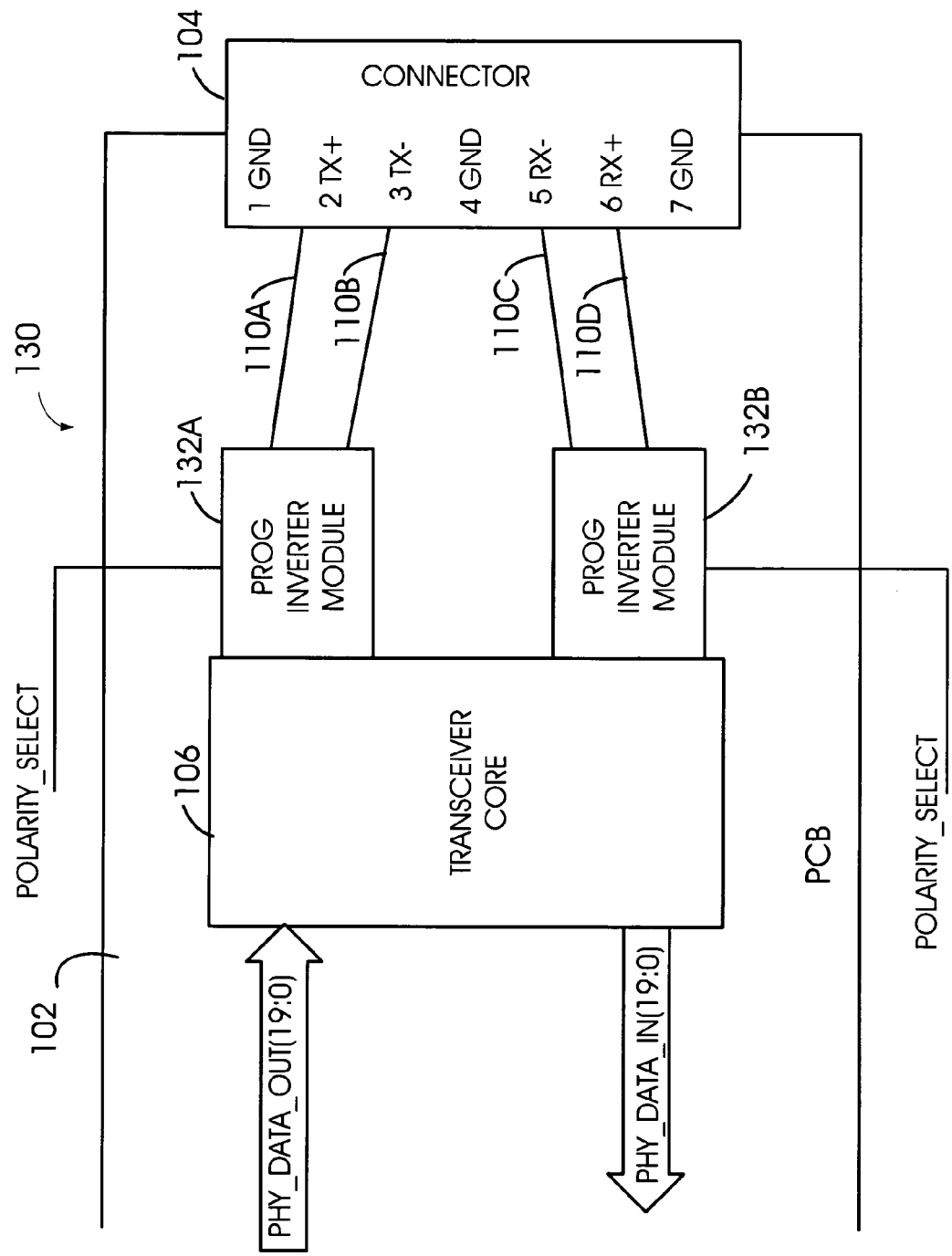
FIG. 6 is a block diagram of an alternative embodiment of the system.

Referring to FIG. 6, a block diagram of an alternative system 130 implementing the present invention is shown. The system 130 generally comprises connector 104, the transceiver core circuit 106, the non-crossing conductive paths 110A–D, and one or more circuits 132A–B. The transceiver core circuit 106 may convert the signal PHY_DATA_OUT to the signals TX+ and TX−. The transceiver core circuit 106 may convert the signals RX+ and RX− to the signal PHY_DATA_IN.

Each of the circuits 132A–B may be implemented as a programmable inverter module. Each programmable inverter module 132A–B may receive the signal POLARITY_SELECT. While the signal POLARITY_SELECT is in the non-inverting state, the programmable inverter modules 132A–B may pass through the signals TX+, TX−, RX+ and RX− without inverting. While the signal POLARITY_SELECT is in the inverting state, the programmable inverter modules 132A–B may invert the signals TX+, TX−, RX+ and RX−. The effect of inverting the signal TX+ may be to recreate the signal TX−. The effect of inverting the signal TX− may be to recreate the signal TX+. The effect of inverting the signal RX+ may be to recreate the signal RX−. The effect of inverting the signal RX− may be to recreate the signal RX+. The programmable inverter modules 132A–B may functionally swap the signal TX+ with the signal TX− and the signal RX+ with the signal RX− when programmed to invert.

Care should be taken in the design of the programmable inverter modules 132A–B to maintain proper signal symmetry. In particular, the programmable inverter modules 132A–B may be required to buffer the differential signals TX and RX such that the signals TX+ and TX− have a predetermined crossing point in amplitude and/or time and the signals RX+ and RX− have another predetermined crossing point in amplitude and/or time. The programmable inverter modules 132A–B may also be required to invert the differential signals TX and RX such that the inverted signals TX+ and TX− maintain the predetermined crossing point and the inverted signals RX+ and RX− maintain the other predetermined crossing point.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation.

While the invention has been particularly shown and described with reference to the preferred embodiments thereof, it will be understood by those skilled in the art that various changes in form and details may be made without departing from the spirit and scope of the invention.

What is claimed is:

1. A system comprising:
   a first circuit configured for converting between a differential serial signal and a parallel signal, wherein said converting is one of (i) from said differential serial signal to said parallel signal and (ii) from said parallel signal to said differential serial signal;
   a pair of non-crossing conductive paths carrying said differential serial signal between said first circuit and a differential interface connectable to a differential serial bus; and a second circuit (i) connected to said first circuit and (ii) configured to invert said parallel signal in response to a control signal in an inverting state.

2. The system according to claim 1, wherein said second circuit is further configured to independently invert each bit of said parallel signal.

3. The system according to claim 1, wherein said second circuit is further configured to buffer said parallel signal in response to said control signal in a non-inverting state.

4. The system according to claim 1, wherein said second circuit comprises:
   a plurality of inverters configured to invert each bit of said parallel signal to present an inverted parallel signal; and
   a multiplexer configured to select between said parallel signal and said inverted parallel signal in response to said control signal.

5. The system according to claim 1, wherein said second circuit comprises a plurality of exclusive-OR gates each configured to receive (i) one bit of said parallel signal and (ii) said control signal.

6. The system according to claim 1, wherein said second circuit comprises (i) a pass gate and (ii) a tri-state inverter for each bit of said parallel signal.

7. A method of communicating on a differential serial bus, the method comprising the steps of:
   (A) converting between a differential serial signal at a first differential interface and a parallel signal, wherein said converting is one of (i) from said differential serial signal to said parallel signal and (ii) from said parallel signal to said differential serial signal;
   (B) routing said differential serial signal on non-crossing paths between said first differential interface and a second differential interface connectable to said differential serial bus; and
   (C) inverting said parallel signal in response to a control signal in an inverting state.

8. The method according to claim 7, wherein said inverting said parallel signal comprises the sub-steps of independently inverting each bit of said parallel signal.

9. The method according to claim 7, further comprising the step of buffering said parallel signal in response to said control signal in a non-inverting state.

10. The method according to claim 7, wherein step (C) comprises the sub-steps of:
    inverting said parallel signal to present an inverted parallel signal; and
    multiplexing said parallel signal and said inverted parallel signal in response to said control signal.

11. The method according to claim 7, wherein step (C) comprises the sub-step of logically exclusive-OR'ing each bit of said parallel signal with said control signal.

12. The method according to claim 7, wherein step (C) comprises the sub-step of opening a pass gate and activating a tri-state inverter for each bit of said parallel signal in response to said control signal in said inverting state.

13. A system comprising:
    a transceiver circuit configured for converting between a first differential serial signal and a first parallel signal, wherein said converting is one of (i) from said first differential serial signal to said first parallel signal and (ii) from said first parallel signal to said first differential serial signal;
    a first inverter circuit (i) connected to said transceiver circuit and (ii) configured to invert said first differential serial signal in response to a first control signal in an inverting state; and
    a pair of non-crossing conductive paths carrying said first differential serial signal between said first inverter circuit and a differential interface connectable to a differential serial bus.

14. The system according to claim 13, wherein said transceiver circuit is further configured to convert between a second differential serial signal and a second parallel signal in an opposite direction than between said first differential signal and said first parallel signal.

15. The system according to claim 14, further comprising a second inverter circuit (i) connected to said transceiver circuit and (ii) configured to invert said second differential serial signal in response to a second control signal in said inverting state.

16. A method of communicating on a differential serial bus, the method comprising the steps of;
    (A) converting between a first differential serial signal and a first parallel signal, wherein said converting is one of (i) from said first differential serial signal to said first parallel signal and (ii) from said first parallel signal to said first differential serial signal;
    (B) inverting said first differential signal at a first differential interface in response to a first control signal in an inverting state; and
    (C) routing said first differential serial signal on first non-crossing paths between said first differential interface and a second differential interface connectable to said differential serial bus.

17. The method according to claim 16, further comprising the step of routing a second differential serial signal from said second differential interface to a third differential serial interface on a second pair of non-crossing paths.

18. The method according to claim 17, further comprising the steps of:
    inverting said second differential serial signal at said third differential interface in response to a second command signal in said inverting state; and
    converting said second differential serial signal to a second parallel signal after said inverting said second differential serial signal.

* * * * *